United States Patent [19]
Hills

[11] Patent Number: 5,925,290
[45] Date of Patent: Jul. 20, 1999

[54] GAS-LIQUID VENTURI MIXER

[75] Inventor: Blair Howard Hills, Charleston, W. Va.

[73] Assignee: Rhone-Poulenc Inc., Research Triangle Park, N.C.

[21] Appl. No.: 08/908,858

[22] Filed: Aug. 8, 1997

[51] Int. Cl.⁶ .................................................. B01D 47/16
[52] U.S. Cl. ...................... 261/36.1; 261/93; 261/121.1; 261/123
[58] Field of Search ............................. 261/91, 93, 36.1, 261/121.1, 123, 124, 77, DIG. 75; 210/219, 220

[56] References Cited

U.S. PATENT DOCUMENTS

| | | | |
|---|---|---|---|
| Re. 32,562 | 12/1987 | Litz | 261/91 |
| 2,130,402 | 9/1938 | Textor | 261/93 |
| 2,293,183 | 8/1942 | Walker | 261/93 |
| 2,801,083 | 7/1957 | Balassa | 259/8 |
| 2,928,661 | 3/1960 | MacLaren | 261/24 |
| 3,744,765 | 7/1973 | Bard | 259/59 |
| 3,806,452 | 4/1974 | Walker | 210/59 |
| 3,846,516 | 11/1974 | Carlson | 261/87 |
| 3,933,640 | 1/1976 | Kirk et al. | 210/197 |
| 3,969,446 | 7/1976 | Franklin, Jr. | 261/87 |
| 4,259,267 | 3/1981 | Wang | 261/93 |
| 4,290,885 | 9/1981 | Kwak | 261/93 |
| 4,328,175 | 5/1982 | Roeckel et al. | 261/91 |
| 4,347,004 | 8/1982 | Platts | 366/137 |
| 4,437,765 | 3/1984 | Seeger | 366/264 |
| 4,454,077 | 6/1984 | Litz | 261/91 |
| 4,645,603 | 2/1987 | Frankl | 210/629 |
| 4,695,378 | 9/1987 | Ackman et al. | 210/198.1 |
| 4,919,849 | 4/1990 | Litz et al. | 261/36.1 |
| 4,956,080 | 9/1990 | Josefik | 210/109 |
| 5,009,816 | 4/1991 | Weise et al. | 261/21 |
| 5,061,406 | 10/1991 | Cheng | 261/76 |
| 5,073,309 | 12/1991 | Bousquet et al. | 261/29 |
| 5,085,809 | 2/1992 | Stirling | 261/77 |
| 5,200,080 | 4/1993 | Bergman, Jr. et al. | 210/607 |
| 5,314,076 | 5/1994 | La Place et al. | 210/205 |
| 5,451,348 | 9/1995 | Kingsley | 261/36.1 |
| 5,494,576 | 2/1996 | Hoppe et al. | 210/198.1 |

FOREIGN PATENT DOCUMENTS 1139463  1/1983  Canada ................................. 261/93

*Primary Examiner*—Jay H. Woo
*Assistant Examiner*—Robea A. Hopkins
*Attorney, Agent, or Firm*—Alan G. Towner; Eckert Seamans Cherin & Mellott, LLC

[57] ABSTRACT

An apparatus and method are provided for mixing gas and liquid. An impeller is rotatably mounted inside a draft tube having a constricted section. Rotation of the impeller draws liquid down through the constricted portion of the draft tube. A gas delivery system introduces gas under the surface of the liquid downstream from the constricted portion of the draft tube to entrain the gas in the liquid by a venturi effect. The impeller creates a turbulent gas-liquid mixing zone and also projects liquid radially into the gas as it enters the draft tube. The gas-liquid venturi mixer is particularly suitable for treating industrial and municipal waste water, as well as various other liquids. Gases such as air, oxygen, hydrogen, and the like are efficiently dissolved in such liquids during operation of the gas-liquid venturi mixer.

39 Claims, 5 Drawing Sheets

GAS-LIQUID VENTURI MIXER

BACKGROUND OF THE INVENTION

1. Field of the Invention

The present invention relates to gas-liquid mixers, and more particularly relates to a gas-liquid venturi mixer which produces high gas entrainment and improved mixing capabilities.

2. Background Information

Gas-liquid mixing systems are conventionally used for various purposes. For example, oxygen is often used to treat liquids such as sewage and hydrometallurgical process liquids, while hydrogen is used to treat various types of unsaturated organic liquids.

Waste water treatment is one particular application where gas-liquid mixing systems are used. Industrial and municipal waste water is often treated by biotreatment techniques in which aerobic organisms convert contaminants into environmentally safe substances. Sufficient oxygen must be provided to the aerobic organisms in order to carry out the biotreatment process. Accordingly, oxygen delivery systems are conventionally used to dissolve either pure oxygen or oxygen from air in the water being treated. In order to be economically feasible, most of the injected pure oxygen must dissolve in the waste water because either the cost of oxygen or the cost of power to aerate with air typically represents the highest operating cost of the system.

Conventional gas-liquid mixers include surface aerators, pressurized gas pumping systems, and vortex mixers. One type of prior art vortex gas-liquid mixing system is referred to as the Advanced Gas Reactor (AGR) system. Such AGR systems incorporate an open ended hollow draft tube in a mixing vessel. An impeller is positioned within the hollow draft tube in order to draw liquid into the top of the hollow draft tube for discharge at the bottom thereof to produce a recirculating flow path in the mixing vessel. Vortices are formed in the inlet area of the draft tube in order to draw feed gas from the overhead space above the surface of the liquid into the recirculating liquid passing downward through the draft tube.

Various types of gas-liquid mixers are disclosed in U.S. Pat. Nos. 3,969,446, 4,645,603, 4,695,378, 4,956,080, 5,061,406, 5,073,309, 5,085,809, 5,314,076 and 5,494,576. U.S. Pat. No. 4,328,175 to Roeckel et al. discloses a vortex mixer including a draft tube with a conical inlet section. U.S. Pat. Nos. 4,454,077 and Re. 32,562 to Litz disclose a vortex mixer including an axial impeller and several structural features which are said to improve gas utilization efficiency. U.S. Pat. No. 5,009,816 to Weise et al. discloses a vortex mixer comprising multiple stacked mixers similar to those disclosed in U.S. Pat. Nos. 4,454,077 and Re. 32,562.

U.S. patent application Ser. No. 08/784,231 discloses a gas-liquid mixer having favorable mixing capabilities.

The disclosure of each patent and application cited above is incorporated herein by reference.

Although attempts have been made to increase the efficiency of gas-liquid mixers, many of the above-noted mixers require large amounts of pumped liquid and multiple recirculation passes of liquid and gas through the mixer in order to achieve sufficient gas dissolution. This leads to a large amount of energy input to achieve the desired amount of gas dissolution. The present invention has been developed in view of the foregoing, and to remedy other deficiencies of the prior art.

SUMMARY OF THE INVENTION

An apparatus and method are provided for mixing gas and liquid. An impeller is rotatably mounted inside a draft tube to draw liquid through the tube. Gas is supplied under the surface of the liquid near the periphery of the draft tube where it is entrained in the flowing liquid by a venturi effect. The arrangement of the impeller and the gas delivery system promotes the formation of eddy currents and turbulence in the gas-liquid mixing zone, and causes radial acceleration of the liquid through the gas as it enters the mixing zone. The gas-liquid venturi mixer is particularly suitable for treating industrial and municipal waste water, as well as various other liquids. Gases such as air, oxygen, hydrogen, and the like are efficiently dissolved in such liquids during operation of the gas-liquid venturi mixer. The apparatus may also act to provide bulk mixing of liquid in a containment vessel.

An object of the present invention is to provide a gas-liquid venturi mixer for efficiently mixing gases and liquids.

Another object of the present invention is to provide an apparatus for mixing gas and liquid including a draft tube having a liquid inlet end and a liquid outlet end, at least one impeller rotatably mounted at least partially inside the draft tube, and a gas delivery system having at least one gas outlet end in flow communication with the liquid inlet end of the draft tube adjacent the periphery of the draft tube.

Another object of the present invention is to provide an apparatus for mixing gas and liquid including a draft tube, an impeller at least partially inside the draft tube adapted for drawing liquid through the draft tube, a gas delivery system for delivering gas to the draft tube under the surface of the liquid, and a venturi for entraining the gas in the liquid as the liquid is drawn through the draft tube.

Another object of the present invention is to provide an apparatus for mixing gas and liquid including a draft tube, a gas delivery system for delivering gas to the draft tube, and an impeller at least partially inside the draft tube. The impeller serves multiple functions of drawing liquid through the draft tube, contacting the gas as it enters the draft tube and projecting the liquid radially into the gas as it enters the draft tube.

Another object of the present invention is to provide a method of mixing gas and liquid, including the steps of providing a draft tube, mounting an impeller at least partially inside the draft tube, providing a supply of gas to the draft tube, submerging the draft tube in a liquid, and rotating the impeller to thereby draw the liquid through the draft tube, contact at least a portion of the gas as it enters the draft tube to form a zone of gas-liquid turbulence and project at least a portion of the liquid radially away from the impeller into the gas as it enters the draft tube. Rotation of the impeller creates a venturi motive force inside the draft tube. By positioning the impeller in the mixing zone, increased gas-liquid mixing is achieved as a result of the sweeping action of the blades below the gas inlet. Improved mixing is also achieved as a result of the supply of gas near the periphery of the draft tube where impeller tip speed is highest and shear rates are maximized.

These and other objects of the present invention will be more readily understood from the following description.

DESCRIPTION OF THE PREFERRED EMBODIMENTS

The gas-liquid venturi mixer of the present invention provides favorable gas transfer efficiency. As used herein, the term "venturi" means an apparatus including a liquid passage having a constriction or throat which creates a zone of low pressure downstream from the constriction for entraining a gas therein. As used herein, the term "gas transfer efficiency" means the power required to dissolve a given mass of gas in a mass of liquid. Gas transfer efficiency may be described in units of kg/(kw·hr) or lb/(horsepower·hr). The present venturi mixer may be used to mix gases such as oxygen, air, hydrogen, sulfur dioxide, chlorine, bromine, inorganic and organic reactants and gaseous acids or bases into liquids such as water, basic solutions, acidic solutions, organic liquids, inorganic solutions and liquid-solid suspensions. The venturi mixer is particularly suitable for mixing oxygen-containing gases into industrial and municipal waste water.

In accordance with the present invention, a venturi effect is used to efficiently mix gases and liquids. The mixer preferably includes a draft tube having a constricted portion which forms the nozzle or throat of the venturi. An impeller is mounted downstream from the constricted portion and provides the motive force for drawing the liquid through the constricted portion of the draft tube, creates a zone of turbulence, and accelerates the liquid radially into the gas inlet zone. Gas is supplied downstream from the constricted portion of the draft tube, near the periphery of the draft tube where it is mixed with the liquid exiting the constriction. As the gas enters the draft tube, the liquid flowing through the constricted portion entrains the gas by a venturi effect. In addition to generating the venturi motive force, the impeller accelerates the liquid radially through the gas as it enters the periphery of the draft tube downstream from the constricted zone, and may also cause cavitation which improves mixing characteristics.

Figure 1:
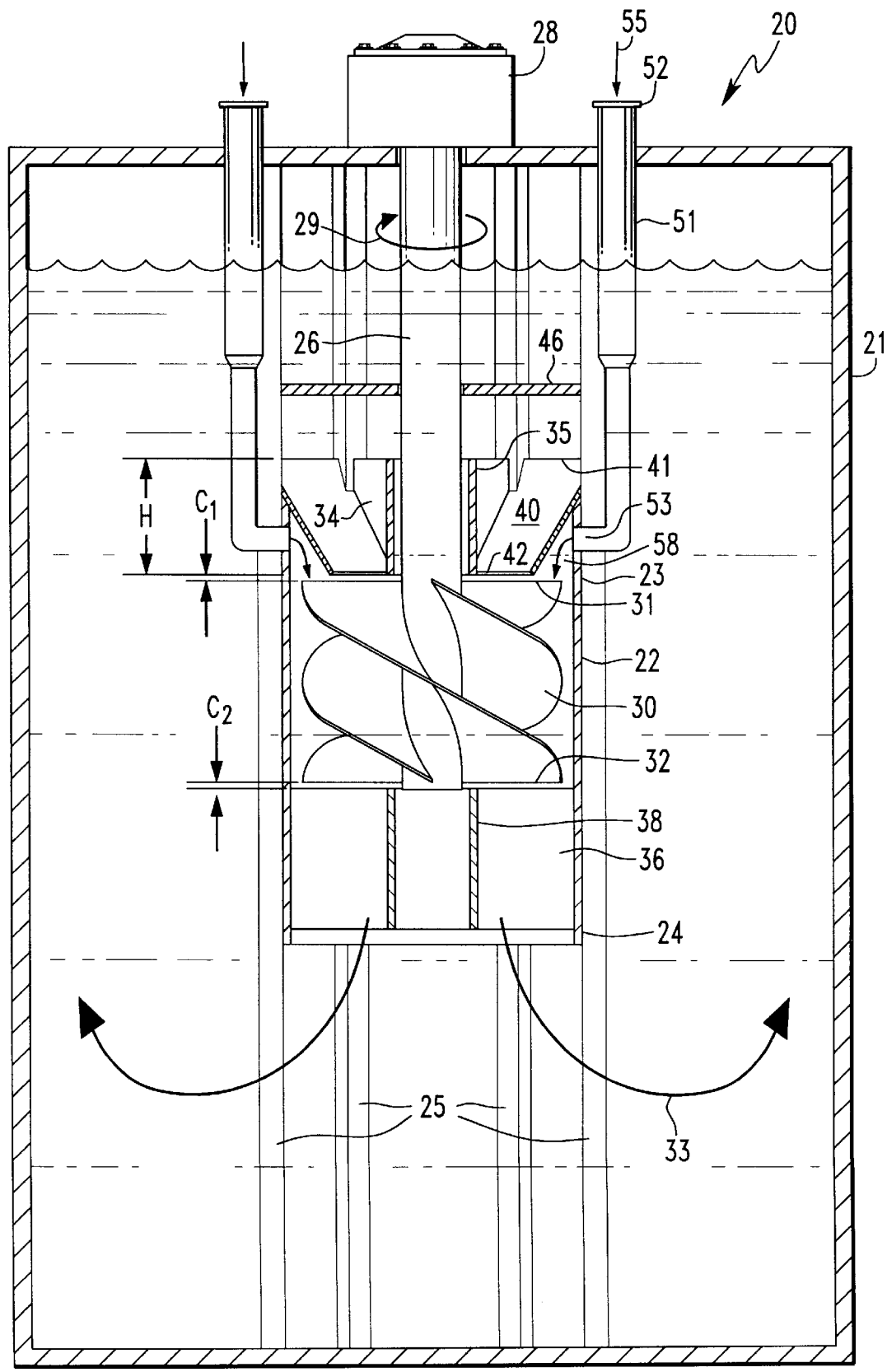
FIG. 1 is a partially schematic sectional side view of a gas-liquid venturi mixer in accordance with an embodiment of the present invention.

An embodiment of a gas-liquid venturi mixer of the present invention is shown in FIG. 1. The venturi mixer 20 may be provided in a vessel 21. The vessel 21 may be an open or closed vessel such as a tank or other suitable container. In addition to the vessel 21 shown in FIG. 1, the venturi mixer 20 may be used in any other body of liquid such as a lagoon, reservoir, lake or the like.

A generally cylindrical draft tube 22 is supported within the vessel 21 by several support members 25. The draft tube 22 includes a liquid inlet end 23 and a liquid outlet end 24. In the embodiment shown in FIG. 1, the support members 25 are attached to the top and bottom of the vessel 21. However, any other suitable support structure may be used. For example, the draft tube 22 may be supported only by legs extending to the bottom of the vessel 21 or arms extending to the side and/or top of the vessel. The draft tube 22 may also be supported by any suitable floatation device on or under the surface of the liquid to be treated.

As shown in FIG. 1, an impeller shaft 26 extends into the draft tube 22. The shaft 26 is actuated by a motor 28 such as a driver driven through a gear box for rotation in the direction of arrow 29. An impeller 30 is mounted on the shaft 26 inside the draft tube 22. The impeller 30 may include at least one leading edge 31 and at least one trailing edge 32. During operation of the venturi mixer 20, rotation of the shaft 26 and impeller 30 in the direction of the arrow 29 causes liquid to circulate through the draft tube 22 generally in the direction shown by the arrows 33. Various types of impellers 30 may be used in accordance with the present invention. For example, helical or marine impellers may be used. In the embodiment shown in FIG. 1, the impeller 30 includes four helical blades, each of which extends about 180° around the shaft 26. However, more or less blades may be used and different blade geometries may be employed.

In the embodiments shown in FIGS. 1–4, the liquid inlet end 23 of the draft tube 22 includes a constricted portion formed by a conical section 40. The conical section 40 includes an upstream opening 41 and a downstream opening 42. The downstream opening 42 has a diameter that is smaller than the inner diameter of the draft tube 22. An annular space is thus defined between the exterior of the conical section 40 and the inner surface of the draft tube 22. The diameter of the downstream opening 42 is preferably less than about 60 percent of the inner diameter of the draft tube 22, more preferably from about 85 percent to about 95 percent of the inner diameter of the draft tube 22.

As shown in FIGS. 1–6, the gas liquid mixer 20 may include a barrier plate 46 axially spaced from the liquid inlet end 23 of the draft tube 22. The barrier plate 46 is preferably axially spaced from the fluid inlet end 23 of the draft tube 22 a distance of from about 0.5 to about 2 times the inner diameter of the draft tube 22, more preferably from about 0.7 to about 1.5 times the inner diameter of the draft tube 22. The barrier plate 46 may be of any suitable shape that extends at least partially across the fluid inlet opening 23 of the draft tube 22. The barrier plate 46 may be disk shaped, having any suitable diameter, for example, from about 1 to about 2 times the inner diameter of the draft tube 22. As more fully described below, the barrier plate 46 reduces or eliminates the formation of gas vortices during operation of the mixer 20. Vortices may also be reduced or eliminated by submerging the mixer a sufficient distance below the surface of the liquid such that vortices are not formed.

Figure 2:
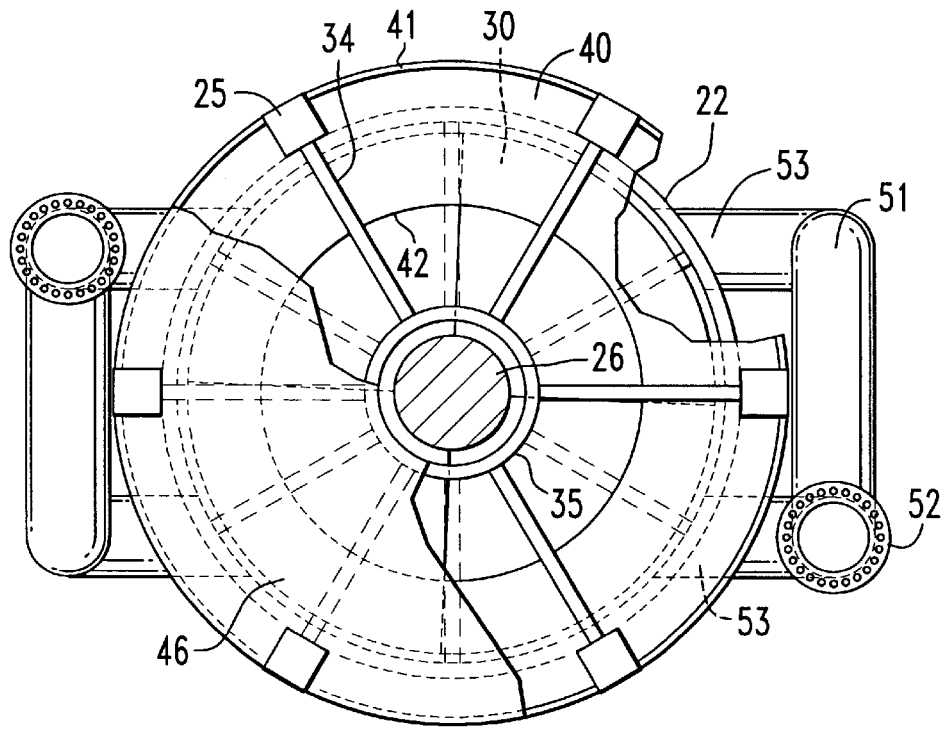
FIG. 2 is a top view of the gas-liquid venturi mixer shown in FIG. 1.
Figure 3:
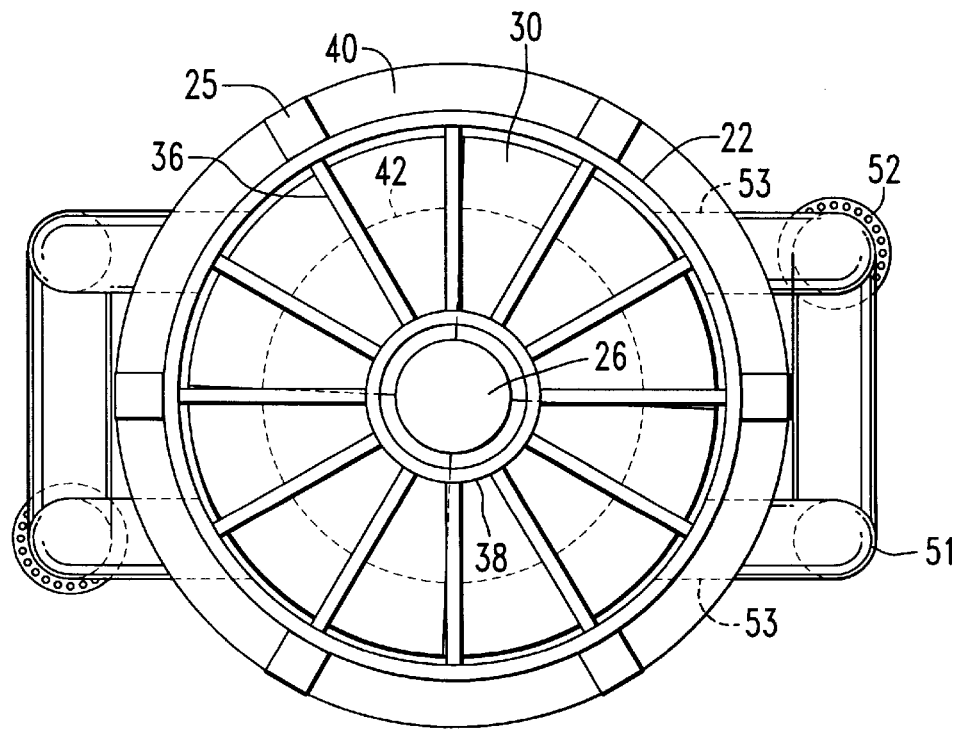
FIG. 3 is a bottom view of the gas-liquid venturi mixer shown in FIG. 1.

In accordance with the present invention, a gas delivery system is used to introduce gas into the draft tube 22. Gas is preferably supplied to the liquid inlet end 23 of the draft tube 22 downstream from a constricted portion of the draft tube. In the embodiment shown in FIGS. 1–3, the gas delivery system includes gas delivery tubes 51 having gas inlet ends 52 and gas outlet ends 53. A single gas delivery tube may be used, or multiple gas delivery tubes may be used. While two gas delivery tubes are shown in FIGS. 1–3, any suitable number of tubes may be used and any type of manifold system may be employed. Likewise, any suitable number of gas inlets and gas outlets may be used. As shown by the arrows 55, gas flows into the inlet ends 52 of the gas delivery tubes 51. The gas flow 55 may be from the atmosphere and/or from a gas supply line or container (not shown). As shown by the arrows 58, the gas flows from the gas outlet ends 53 into the draft tube 22. The gas flow 58 is thus provided in the annular space formed between the conical section 40 and the draft tube 22. The amount of gas introduced into the annular space can be controlled in order to optimize the ratio of entrained gas to pumped liquid, thereby maintaining the desired energy of the gas-liquid jet exiting the mixer and optimizing tank mixing and gas transfer efficiency. For example, valves (not shown) may be installed in the inlet ends 52 of the gas delivery tubes 51.

Figure 4:
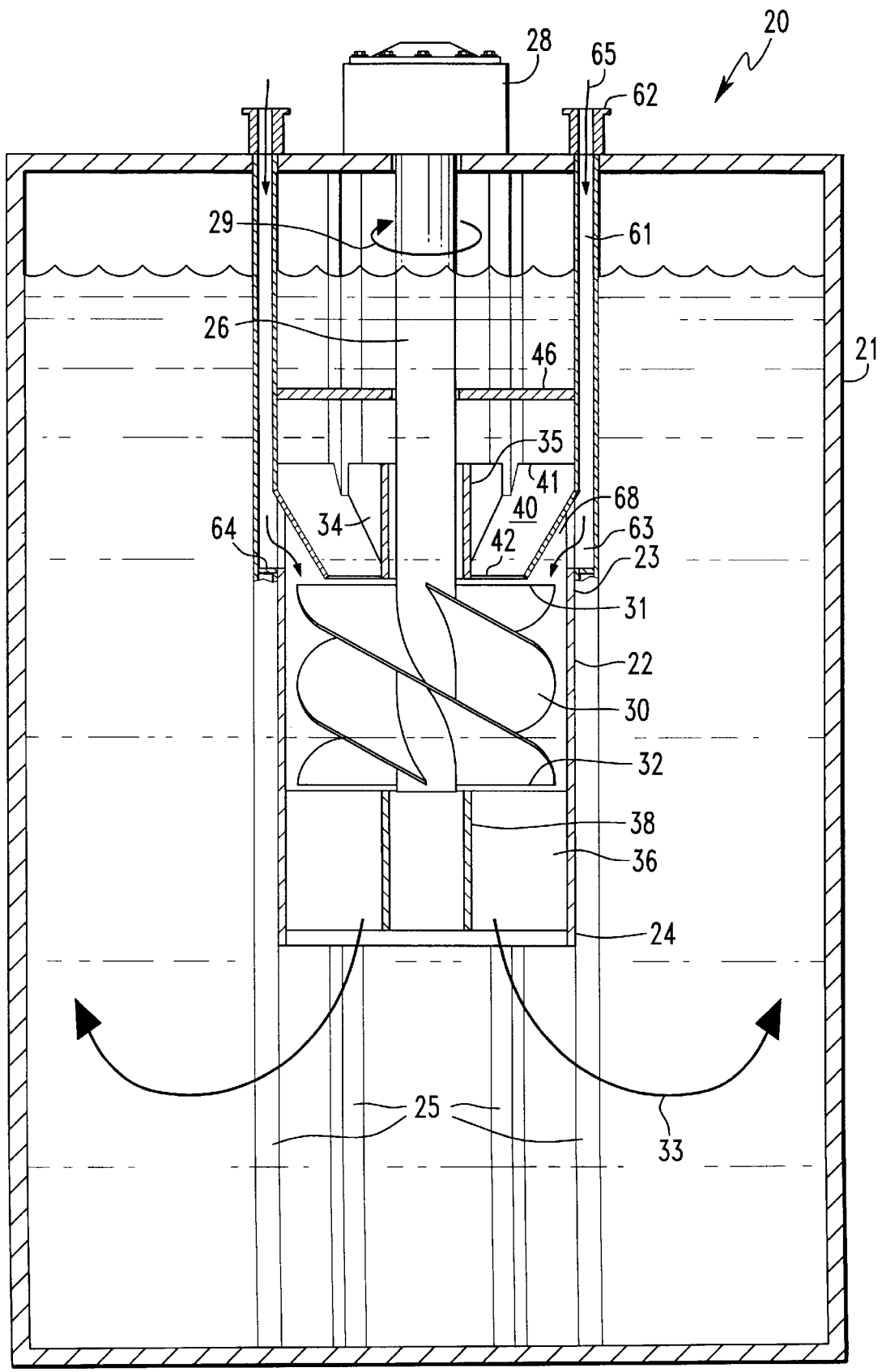
FIG. 4 is a partially schematic sectional side view of a gas-liquid venturi mixer in accordance with another embodiment of the present invention.

The gas delivery system shown in FIG. 4 likewise provides for the introduction of gas in the annular space between the conical section 40 and the draft tube 22. However, in this embodiment, the support members 25 form part of the gas delivery system. The upper portions 61 of the support members 25 form hollow gas delivery tubes. Each gas delivery tube 61 includes a gas inlet end 62 and a gas outlet end 63. A plug 64 is positioned near the gas outlet end 63 of each gas delivery tube 61 in order to direct the flow of gas into the draft tube 22. As shown by arrows 65 and 68, gas flows into the inlet end 62 and out of the outlet end 63 of the gas delivery tube 61. In this embodiment, the gas delivery tubes 61 serve the dual purpose of delivering gas and supporting the draft tube 22.

Figure 5:
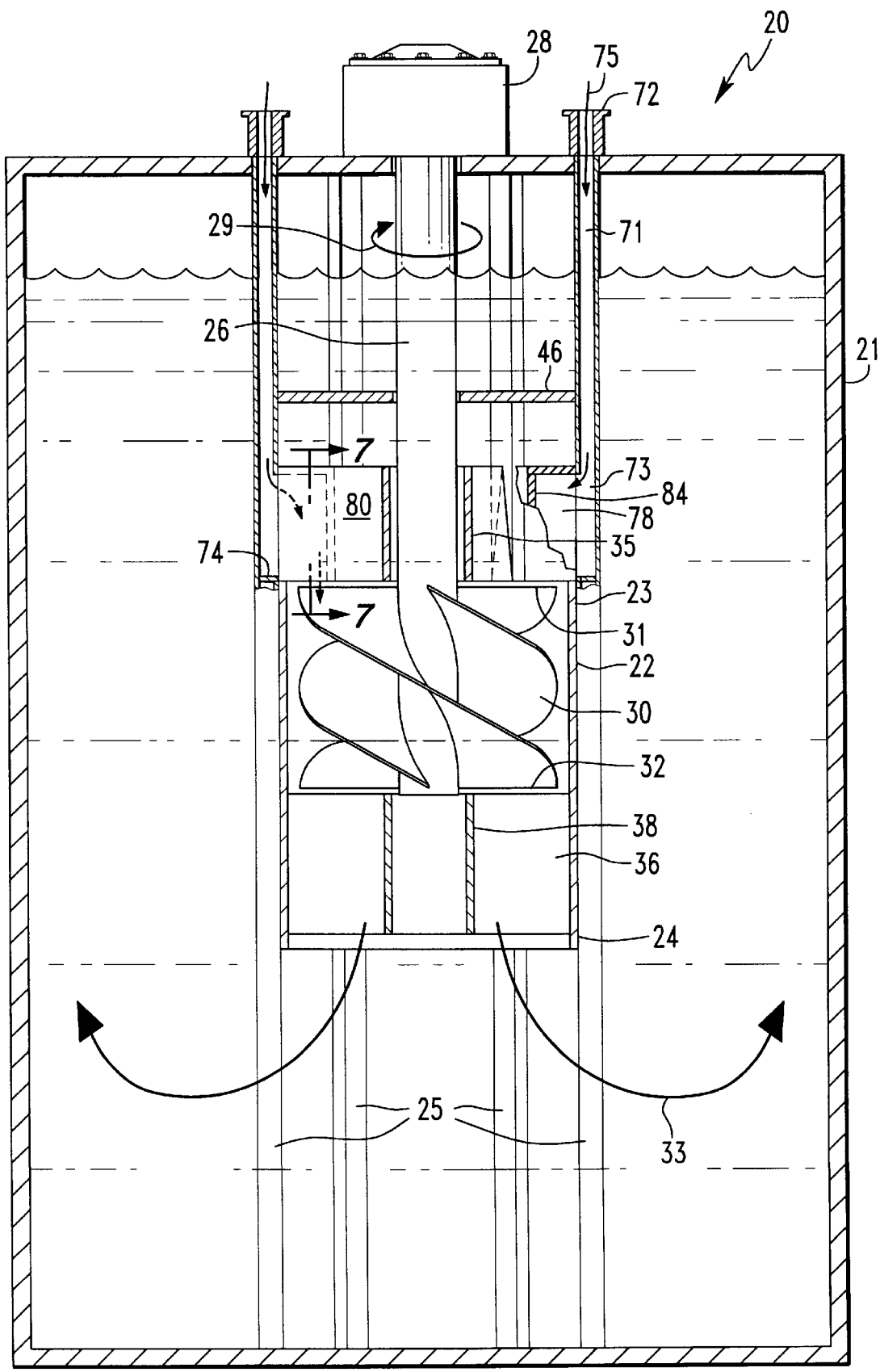
FIG. 5 is a partially schematic sectional side view of a gas-liquid venturi mixer in accordance with another embodiment of the present invention.
Figure 6:
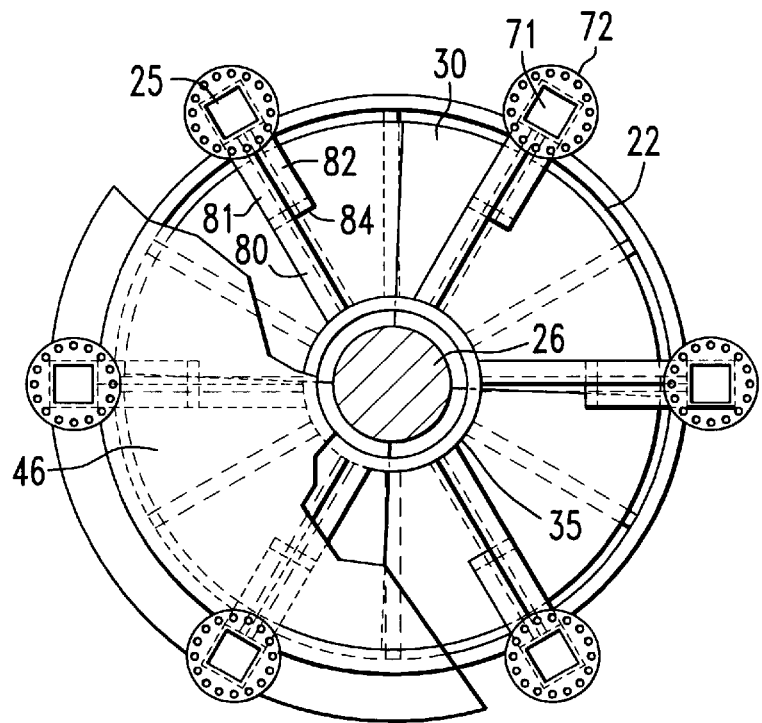
FIG. 6 is a top view of the gas-liquid venturi mixer shown in FIG. 5.

The embodiment shown in FIGS. 5 and 6 likewise incorporates a gas delivery system as part of the support members for the draft tube 22. The gas delivery tubes 71 include inlet and outlet ends 72 and 73. A plug 74 helps direct the flow of gas from each delivery tube 71 into the draft tube 22. The gas flow is shown by arrows 75 and 78. While the gas delivery system shown in FIGS. 5 and 6 is incorporated in the support structure for the draft tube 22, any other suitable gas delivery system may be used. For example, single or multiple gas delivery tubes with any suitable manifold system such as those shown in FIGS. 2–4 may be used.

Figure 7:
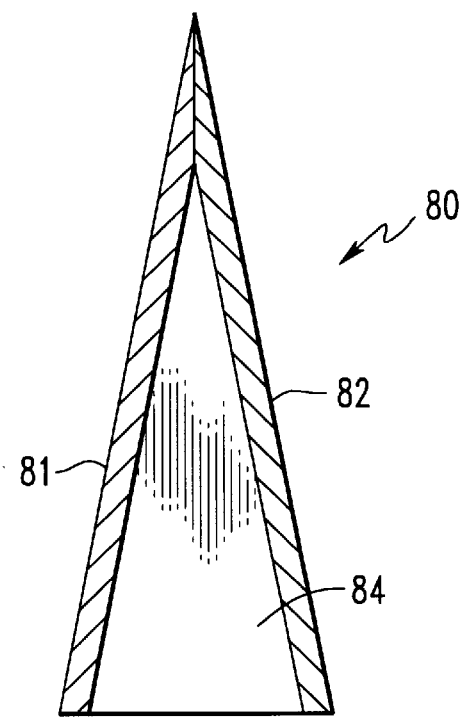
FIG. 7 is a sectional view of a gas delivery baffle of the gas-liquid venturi mixer shown in FIG. 5.

In the embodiment shown in FIGS. 5 and 6, inlet baffles 80 are positioned inside the draft tube 22. In this embodiment, the inlet baffles 80 are tapered such that they form a constriction at the liquid inlet end 23 of the draft tube 22. As shown most clearly in FIGS. 6 and 7, each inlet baffle 80 includes a first face 81 which extends radially from the inner surface of the draft tube 22 to the sleeve 35. A second face 82 extends radially from the draft tube 22 partially toward the sleeve 35. A radial end wall 84 is positioned between the first and second faces 81 and 82. The inlet baffle 80 is thus formed in the shape of an inverted V having a hollow portion into which gas is supplied. While V-shaped baffles are shown in FIGS. 6 and 7, any other suitable configuration may be used, with low drag configurations being preferred. As shown in FIGS. 5 and 6, gas supplied through the delivery tubes 71 flows into the hollow portions of the inlet baffles 80. The radial end wall 84 inside each inlet baffle 80 directs the gas flow near the periphery of the draft tube 22, such that the gas is introduced near the outward radial portion of the impeller 30. The gas is thus introduced near the tips of the impeller 30 where the rotational speed is the greatest, causing the liquid to be projected radially into the gas and causing turbulence, eddy currents and/or cavitation, thereby improving gas transfer efficiency.

In accordance with a preferred embodiment of the present invention, the clearance between the blades of the impeller 30 and the inner diameter of the draft tube 22 is minimized, as shown most clearly in FIGS. 1–6. The impeller blades 30 typically extend radially from the central axis of the shaft 26 to a diameter of at least about 90 percent of the inner diameter of the draft tube 22, more preferably at least about 95 percent, and most preferably about 97 percent. For example, for a draft tube 22 having an inner diameter of about 36 inches, the impeller blades 30 preferably have a diameter of at least about 35 inches. For draft tubes having inner diameters of between about 0.3 and 5 feet, the clearance between the radial outermost tips of the impeller blades 30 and the inner surface of the draft tube 22 is preferably less than about 1.5 inches, more preferably less than about 1 inch.

As shown most clearly in FIGS. 1, 2 and 4, the venturi mixer 20 may include several inlet baffles 34 in the vicinity of the inlet end 23 of the draft tube 22. The inlet baffles 34 may be mounted by any suitable means such as welding or mechanical fasteners. In the embodiments shown in FIGS. 1–4, the inlet baffles 34 are attached to the conical section 40 by welding. However, the inlet baffles 34 may be fastened in relation to the draft tube 22 at any other suitable location using various types of fastening means. The inlet baffles 34 are preferably connected to a sleeve 35 which surrounds the shaft 26 in order to provide increased structural rigidity. The inlet baffles 34 may be attached to the sleeve 35 by welding, mechanical fasteners or any other suitable means. In order to increase the surface area of the inlet baffles 34, it may be preferred to minimize the clearance between the sleeve 35 and the shaft 26, and to minimize the thickness of the sleeve 35. It is also preferred to provide several inlet baffles 34 in order to sufficiently reduce prerotation of the liquid in the direction of rotation of the impeller 30 as the liquid enters the conical section 40 at the inlet end 23 of the draft tube 22. While six inlet baffles 34 are shown in FIG. 2, any suitable number may be used as long as they effectively reduce prerotation. From 2 to 10 inlet baffles 34 are preferably used. In addition, while the baffles 34 shown in FIGS. 1 and 2 are flat and extend vertically, they can be curved or angled to provide a counterflow of fluid in a direction opposite to the direction of rotation 29 of the impeller 30.

As shown most clearly in FIGS. 1, 4 and 5, the clearance $C_1$ between the inlet baffles 34 and the leading edge 31 of the impeller 30 is preferably minimized in some applications. By reducing the clearance $C_1$, prerotation of the liquid is reduced, maximizing the axial velocity of the liquid. The clearance $C_1$ is preferably less than about 15 percent of the inner diameter of the draft tube 22, more preferably less than about 2 percent. For example, for draft tubes having inner diameters of from about 0.3 to 5 feet, the clearance $C_1$ is preferably less than 10 inches, more preferably less than 2 inches. As a particular example, the clearance $C_1$ is preferably less than about 1.5 inches for a draft tube having an inner diameter of about 36 inches.

As shown most clearly in FIGS. 1, 3, 4 and 5, the venturi mixer 20 may include outlet baffles 36 located adjacent the impeller 30 in the vicinity of the outlet end 24 of the draft tube 22. The outlet baffles 36 may be fastened in relation to the draft tube 22 by any suitable means, such as welding or mechanical fasteners. The outlet baffles 36 may be connected to a sleeve 38 by welding or any other suitable means in order to increase structural rigidity. In the embodiment shown in FIG. 3, twelve outlet baffles 36 are disposed at equal distances around the inner circumference of the draft tube 22. In order to increase shear rates, it may be preferable to use several outlet baffles 36, for example, from 4 to about 36 outlet baffles. While flat vertically extending outlet baffles 36 are shown in FIGS. 1, 3, 4 and 5, curved or angled outlet baffles may be used. In addition to, or in place of, the stationary outlet baffles 36 shown in FIGS. 1 and 3, the baffles may be rotated in a direction opposite the rotational direction 29 of the impeller 30. Such counter-rotating outlet baffles may be provided, for example, in the form of a counter-rotating impeller. Alternatively, the outlet baffles may be in the form of at least one perforated plate disposed horizontally below the impeller 30.

In accordance with an embodiment of the present invention, the outlet baffles 36 are positioned directly adjacent the trailing edge 32 of the impeller 30, as shown most clearly in FIGS. 1, 4 and 5. The clearance $C_2$ between the trailing edge 32 of the impeller 30 and the outlet baffles 36 is preferably less than about 10 percent of the inside diameter of the draft tube, more preferably less than about 2 percent. For example, for draft tubes having inner diameters of from about 0.3 to 5 feet, the clearance $C_2$ is preferably less than about 3 inches, more preferably less than about 1 inch. As a particular example, the clearance $C_2$ is preferably less than about 0.75 inch for a draft tube having an inner diameter of three feet. By minimizing the clearance $C_2$, substantially increased gas entrainment and shear rates may be achieved, resulting in substantially increased gas transfer efficiency. By minimizing the clearance $C_2$ and providing a sufficient number of outlet baffles 36, substantially all of the liquid travelling axially downward through the draft tube 22 contacts at least one of the outlet baffles as it exits the impeller 30. This contact region creates high shear rates while minimizing rotation of the outlet gas-liquid jet.

The various components of the vortex mixer 20 are made from any suitable materials, preferably metals. For example, the draft tube 22, shaft 26, impeller 30, inlet baffles 34, outlet baffles 36 and conical section 40 may be made from metal such as stainless steel.

In accordance with a preferred embodiment of the present invention, the tip speed of the impeller 30 is controlled in order to provide improved mixing. The term "tip speed" means the angular velocity at which the radial outermost portion of the impeller 30 travels. The tip speed of the impeller 30 is preferably controlled in order to induce cavitation and project the liquid into the gas in the region downstream from the constricted portion of the draft tube 22 in the area where the gas is introduced into the draft tube. Typical tip speeds are usually from about 20 to about 150 feet per second or higher. Depending on the diameter of the impeller 30 used, the rotational speed of the shaft 26 is controlled in order to achieve the desired impeller tip speed. For example, for an impeller having a diameter of 3 feet, the shaft 26 may be rotated at a speed of about 350 rpm to obtain an impeller tip speed of about 50 feet/second. The use of controlled impeller tip speeds in combination with the supply of gas downstream from the constricted portion of the draft tube near the periphery thereof provides enhanced gas entrainment and gas transfer efficiency.

The following example is intended to illustrate various aspects of the present invention and is not intended to limit the scope thereof.

EXAMPLE

A venturi mixer is constructed as shown in FIGS. 1–3. The draft tube has an inner diameter of about 37 inches. The conical section has an inlet diameter of about 42 inches, an outlet diameter of about 32 inches and a height of about 20 inches. The helical impeller has a diameter of about 35 inches, includes 4 blades which each extend about 180° around the circumference of the impeller shaft and has a blade pitch of about 1.15. The mixer includes 3 upper baffles located within about 0.5 inch of the impeller, and 12 lower baffles located within about 0.5 inch of the impeller. The unit is floated in a 3.4 million gallon tank having a 140 foot diameter and a sidewall depth of 30 feet which is 60 percent filled with water. The top of the draft tube is submerged about 20 inches under the surface of the water. The helical impeller is rotated at a speed of 350 rpm by a 150 hp motor to provide a helical impeller tip speed of about 53 feet/second. The mixer achieves a high gas transfer efficiency as measured by the ASCE SOTE technique. Under no gas flow conditions where the gas inlet is closed, the maximum vacuum achieved is 7 inches of Hg. When the gas inlet is opened large volumes of gas are drawn into the draft tube. The mixer generates a substantially constant pumped liquid volume which acts to efficiently bulk mix the liquid throughout the tank.

While particular embodiments of the present invention have been described herein, it is to be understood that various changes, additions, modifications and adaptations may be made without departing from the scope of the invention, as set forth in the following claims.

What is claimed is:

1. An apparatus for mixing gas and liquid comprising:
a draft tube having a liquid inlet end, a liquid outlet end and a constricted portion between the liquid inlet end and the liquid outlet end, wherein the constricted portion projects within the confines of the draft tube;
at least one impeller rotatably mounted at least partially inside the draft tube; and
a gas delivery system having at least one gas outlet end downstream from the constricted portion in flow communication with the liquid inlet end of the draft tube adjacent a periphery of the draft tube.

2. The apparatus of claim 1, wherein the constricted portion is formed by a substantially conical section.

3. The apparatus of claim 2, wherein the conical section includes a downstream opening inside the draft tube of smaller diameter than an inner diameter of the draft tube defining a substantially annular space inside the draft tube, and the at least one gas outlet end is in flow communication with the substantially annular space.

4. The apparatus of claim 3, wherein the diameter of the downstream opening is from about 80 to about 95 percent of the inner diameter of the draft tube.

5. The apparatus of claim 3, further comprising:
at least one inlet baffle located at least partially inside the conical section.

6. The apparatus of claim 1, wherein the constricted portion is formed by at least one inlet baffle.

7. The apparatus of claim 6, wherein the at least one inlet baffle is at least partially hollow and the at least one gas outlet end is in flow communication with the hollow portion of the at least one baffle.

8. The apparatus of claim 7, wherein the hollow portion of the at least one inlet baffle comprises an end wall for directing gas toward the periphery of the draft tube.

9. The apparatus of claim 7, wherein the at least one inlet baffle has an inverted V shape.

10. The apparatus of claim 1, further comprising:
a barrier plate axially spaced from the liquid inlet end of the draft tube.

11. The apparatus of claim 10, wherein the barrier plate is axially spaced from the fluid inlet end of the draft tube a distance of from about 0.5 to about 2 times the inner diameter of the draft tube.

12. The apparatus of claim 11, wherein the barrier plate is substantially disk shaped and has an outer diameter of from about 1 to about 2 times the inner diameter of the draft tube.

13. The apparatus of claim 1, wherein the gas delivery system comprises a plurality of gas delivery tubes.

14. The apparatus of claim 1, wherein the draft tube is supported by a plurality of support members and the gas delivery system comprises at least one gas delivery tube inside at least one of the support members.

15. The apparatus of claim 1, further comprising:
at least one inlet baffle adjacent the liquid inlet end of the draft tube.

16. The apparatus of claim 15, wherein the impeller and at least one inlet baffle have a clearance of less than about 5 percent of an inner diameter of the draft tube.

17. The apparatus of claim 16, wherein the inner diameter of the draft tube is from about 0.3 to about 5 feet, and the impeller and the at least one inlet baffle have a clearance of less than about 2 inches.

18. The apparatus of claim 1, further comprising:
at least one outlet baffle adjacent the liquid outlet end of the draft tube.

19. The apparatus of claim 18, wherein the impeller and the at least one outlet baffle have a clearance of less than about 2 percent of an inner diameter of the draft tube.

20. The apparatus of claim 19, wherein the inner diameter of the draft tube is from about 0.3 to about 5 feet, and the impeller and the at least one outlet baffle have a clearance of less than about 1 inch.

21. An apparatus for mixing gas and liquid comprising:
a draft tube;
impeller means at least partially inside the draft tube for drawing liquid through the draft tube;
gas delivery means for delivering gas to the draft tube under the surface of the liquid; and
venturi means for entraining the gas in the liquid as the liquid is drawn through the draft tube by the impeller means and after the liquid passes a constricted portion of the draft tube, wherein the constricted portion projects within the confines of the draft tube.

22. The apparatus of claim 21, wherein the gas delivery means comprises at least one gas delivery tube having at least one gas outlet end extending through a sidewall of the draft tube.

23. The apparatus of claim 21, wherein the constricted portion is formed by a substantially conical section.

24. The apparatus of claim 23, wherein the conical section includes a downstream opening inside the draft tube of smaller diameter than an inner diameter of the draft tube defining a substantially annular space inside the draft tube, and the gas delivery means is in flow communication with the substantially annular space.

25. The apparatus of claim 23, further comprising:
at least one inlet baffle located at least partially inside the conical section.

26. The apparatus of claim 21, wherein the constricted portion is formed by at least one inlet baffle.

27. The apparatus of claim 26, wherein the at least one inlet baffle is at least partially hollow and the gas delivery means is in flow communication with the hollow portion of the at least one baffle.

28. The apparatus of claim 27, wherein the at least one inlet baffle has an inverted V shape.

29. The apparatus of claim 21, further comprising:
means for substantially preventing formation of gas vortices in the liquid as the liquid is drawn through the draft tube.

30. The apparatus of claim 29, wherein the means for substantially preventing formation of vortices comprises a barrier plate axially spaced from a liquid inlet end of the draft tube.

31. The apparatus of claim 30, wherein the barrier plate is substantially disk shaped, is axially spaced from the fluid inlet end of the draft tube a distance of from about 0.5 to about 2 times the inner diameter of the draft tube, and has an outer diameter of from about 0.5 to about 2 times of the inner diameter of the draft tube.

32. The apparatus of claim 21, further comprising:
at least one inlet baffle adjacent a liquid inlet end of the draft tube.

33. The apparatus of claim 21, further comprising:
at least one outlet baffle adjacent a liquid outlet end of the draft tube.

34. An apparatus for mixing gas and liquid comprising:
a draft tube; a constricted portion of the draft tube, wherein the constricted portion projects within the confines of the draft tube;
gas delivery means for delivering gas to the draft tube; and
impeller means at least partially inside the draft tube for drawing liquid through the draft tube, wherein a zone of low gas pressure is created behind a swept volume of the impeller, and wherein at least a portion of the gas is contacted with the liquid as the gas enters the draft tube adjacent to the low gas pressure zone.

35. The apparatus of claim 34, wherein the gas delivery means includes means for delivering the gas to the draft tube downstream from the constricted portion.

36. The apparatus of claim 34, further comprising:
means for substantially preventing formation of gas vortices in the liquid as the liquid is drawn through the draft tube.

37. A method of mixing gas and liquid, the method comprising:
providing a draft tube; providing a constricted portion of the draft tube, wherein the constricted portion projects within the confines of the draft tube;
mounting an impeller at least partially inside the draft tube;
providing a supply of gas to the draft tube;
submerging the draft tube in a liquid; and
rotating the impeller to draw the liquid through the draft tube, creating a zone of low gas pressure behind a swept volume of the impeller, and contacting at least a portion of the gas with the liquid as the gas enters the draft tube adjacent to the low gas pressure zone.

38. The method of claim 37, further comprising and supplying the gas to the draft tube downstream from the constricted portion.

39. The method of claim 37, further comprising substantially preventing the formation of gas vortices in the liquid as the liquid is drawn through the draft tube.

* * * * *